Patented Aug. 9, 1949

2,478,824

UNITED STATES PATENT OFFICE 2,478,824

MANUFACTURE OF 3-CHLOROCOUMARIN

Harold S. Halbedel, Euclid, and James C. Heath, Cleveland, Ohio, assignors to The Harshaw Chemical Company, Cleveland, Ohio, a corporation of Ohio No Drawing. Application August 17, 1948, Serial No. 44,797

9 Claims. (Cl. 260—344.6)

This invention relates to the preparation of 3-chlorocoumarin and especially to a process resulting in improvement in yields thereof.

We are aware that prior to our invention 3-chlorocoumarin has been prepared and accordingly we do not claim the compound itself but only our novel method of preparation. Perkin (J. Chem. Soc. of London (Abstracts) 24:43 (1871)) prepared 3-chlorocoumarin by first passing chlorine into a chloroform solution of coumarin whereby to obtain coumarin dichloride. The coumarin dichloride was then treated with alcoholic potash whereby 3-chlorocoumarin was obtained. Perkin found that coumarin dichloride is converted to chlorocoumarin by heating in the absence of a solvent; however, tars and other decomposition products lower the yield and quality of 3-chlorocoumarin produced in this way. When dehydrochlorination is controlled as it is here by the presence of a boiling solvent, increased yields of the desired products are obtained.

On duplication of Perkin's process we have consistently obtained yields in the order of 40% of theoretical. Changes in temperature, use of $I_2$, $SbCl_5$ and ultraviolet light as catalyst and such variations failed to improved the yield.

We have now discovered that by passing chlorine into a solution of coumarin in pentachlor ethane or a tetrachlor ethane at from 90° C. to 130° C., and then evaporating off the solvent (a tetrachlor ethane, pentachlor ethane or a mixture thereof) and any products formed by chlorination of the solvent during the reaction, we are able to obtain a high yield of a mixture of 3-chlorocoumarin and 3,4-coumarin dichloride. The proportion of 3-chlorocoumarin present at this point may be quite high, perhaps as high as about 85% under favorable conditions. This mixture will have ultility for some purposes; but for other purposes, a further conversion of the coumarin dichloride content to 3-chlorocoumarin is highly desirable. (Trichlor ethanes boil too low, to afford suitable solvent properties, whereas $C_2Cl_6$ is a solid which sublimes. Thus, tetrachlor and pentachlor ethanes are the only chlorethanes which are suitable for our purpose.) The residue from this distillation may be heated with a saturated lower aliphatic alcohol having from 1 to 4 carbon atoms, e. g., methyl, ethyl, propyl, isopropyl, or butyl alcohols within the temperature range from 64° C. to 118° C. until the 3,4-coumarin dichloride content of the mixture is almost entirely converted to 3-chlorocoumarin. This may require from ½ to 2 hours and the alcohol may be prevented from escaping from the reaction mixture by carrying out the heating in a receptacle provided with a reflux condenser. The mixture may be cooled, whereupon the 3-chlorocoumarin crystallizes out of the alcoholic solution, and then filtered and washed with an additional portion of the alcohol and dried. The product is a white crystalline powder melting at 121° C. to 123° C. We have found that by the foregoing process, yields in excess of 90% are obtainable.

So far as we are aware, no one has previously suggested the chlorination of coumarin in a tetrachlorethane or pentachlor ethane and no one has used one of the above alcohols to complete the dehydrochlorination of 3,4-coumarin dichloride. The experimental yield is surprisingly high and the purity of the product is likewise high. Recovery of the pentachlor ethane or tetrachlor ethane is somewhat dependent upon the equipment used, but we have been able to effect a 90% recovery and feel that by careful attention to the problem, it may be possible to do better.

The proportions of coumarin and pentachlor ethane or tetrachlor ethane may be varied through a considerable range, but there should be at least 5 weight units of pentachlor ethane or a tetrachlor ethane or mixture thereof for each weight unit of coumarin; and the upper limit of the quantity of solvent which will operate successfully is greater than it would be convenient to use. That is, very large quantities could be used, but would not be advantageous. Satisfactory proportions are from 5 to 8 or 10 parts by weight of pentachlor ethane or tetrachlor ethane to each part by weight of coumarin. The amount of chlorine which will react with coumarin is indicated by the fact that one molecule of $Cl_2$ is required for each molecule of coumarin to be chlorinated. A greater proportion of chlorine is introduced into the reaction mixture, since some is used up in chlorinating the solvent and as the reaction progresses toward completion, less efficient use is made of $Cl_2$. Any further excess will pass out of the reaction mixture and its presence will do no harm. The reaction may be carried out at atmospheric pressure or higher or lower pressures. In distilling off the solvent from the reaction mixture, the temperature of the receptacle should not be permitted to go above 225° C. When the distillation is complete, the alcohol may be added and the mixture heated to effect dehydrochlorination of the coumarin dichloride content of the reaction mixture. The amount of alcohol to be added may be varied but enough should be present to dissolve all the crystalline material at the boiling point of the solution; roughly 2 parts by weight of alcohol to each part by weight of the residue. We have found that upon chlorination in pentachlor ethane or a tetrachlor ethane or any mixture thereof, the chlorination step plus the step of evaporating off the solvent at the indicated temperatures give largely 3-chlorocoumarin instead of 3,4-coumarin dichloride as in the case where chloroform is employed as the solvent. Also, and very surprisingly, the dehydrochlorination, so far as not completed in the pentachlorethane or tetrachlor ethane is completed or very nearly so when the mixture is heated with the alcohol. After cooling to room temperature or thereabout and filtering, the 3-chlorocoumarin may be washed with a further portion of the alcohol for further purification if desired.

The following examples will serve to illustrate the invention:

Example I

To a three liter flask provided with reflux condenser, thermometer, stirrer and gas inlet tube was added 2150 grams of pentachlor ethane and 219 grams of coumarin. This mixture was heated to 100° C. and held in the range from 100° C. to 110° C. while chlorine was passed in through the gas inlet tube. During 2½ hours the amount of chlorine passed in amounted to 255 grams. The chlorination reaction was then complete. The reaction mixture was boiled until the solvent had been removed and the vapor temperature raised to 200° C. The flask was then cooled to about 120° C. and 400 grams of isopropyl alcohol were added. Similar batches brought to this point under identical conditions were treated with 400 grams of methyl, ethyl, propyl and butyl alcohols respectively. The resulting mixtures were heated at about 86° C. for 1½ hours, the alcohol being kept in by means of the reflux condenser. Each mixture was discharged hot into a beaker and cooled to room temperature with stirring, then filtered and the residue washed with 200 grams of isopropyl alcohol to remove any impurities. The product was dried at 60° C. in each case. The product was a white crystalline powder having a melting point from 121° C. to 123° C. The melting point of 3-chlorocoumarin as reported in the literature is 122° C.–123° C. The yields were 251 grams, 241 grams, 249 grams, 249 grams and 240 grams respectively against a theoretical yield of 270 grams, an 89% to 93% yield.

Example II

Example I was repeated (using isopropyl alcohol) with the exception that a mixture of $(CHCl_2)_2$ and $CH_2ClCCl_3$ was substituted for the pentachlor ethane. The yield of 3-chlorocoumarin was 230 grams, about an 85% yield.

Having thus described our invention, what we claim is:

1. In a process for preparing 3-chlorocoumarin, the steps of dissolving coumarin in a chlorethane having from 4 to 5 chlorine atoms in the molecule, passing chlorine into said solution at from 90° C. to 130° C. to convert the coumarin into chlorocoumarins and evaporating off the solvent and chlorination products thereof, the amount of chlorine employed being in excess of 1 molecule of $Cl_2$ per molecule of coumarin.

2. In a process for preparing 3-chlorocoumarin from coumarin, the steps of dissolving coumarin in a chlorethane having from 4 to 5 chlorine atoms in the molecule, passing chlorine into said solution at from 90° C. to 130° C. and in quantity in excess of 1 molecule of $Cl_2$ per molecule of coumarin whereby to convert the coumarin into coumarin dichloride, evaporating off the solvent and chlorination products thereof from the resulting mixture, heating the resulting material in a saturated aliphatic alcohol having from 1 to 4 carbon atoms for further dehydrochlorination of the coumarin dichloride content, cooling the mixture and separating the product from said alcohol.

3. In a process for preparing 3-chlorocoumarin from coumarin, the steps of dissolving coumarin in at least five times its weight of a chlorethane having from 4 to 5 chlorine atoms in the molecule, passing chlorine into said solution at from 90° C. to 130° C. to convert the coumarin into chlorocoumarins and evaporating off the solvent and chlorination products thereof, the amount of chlorine employed being in excess of 1 molecule of $Cl_2$ per molecule of coumarin.

4. In a process for preparing 3-chlorocoumarin from coumarin, the steps of dissolving coumarin in a chlorethane having from 4 to 5 chlorine atoms in the molecule, passing chlorine into said solution at from 90° C. to 130° C. to convert the coumarin into chlorocoumarins, evaporating off the solvent and chlorination products thereof, the amount of chlorine employed being in excess of 1 molecule of $Cl_2$ per molecule of coumarin heating the resulting material in a saturated aliphatic alcohol having from 1 to 4 carbon atoms at from 64° C. to 118° C. for further dehydrochlorination of the coumarin dichloride content, cooling the mixture and separating the product from said alcohol.

5. In a process for preparing 3-chlorocoumarin from coumarin, the steps of dissolving coumarin in pentachlorethane passing gaseous chlorine into the solution at from 90° C. to 130° C. to convert the coumarin into chlorocoumarins and evaporating off the solvent and chlorination products thereof, the amount of chlorine employed being in excess of 1 molecule of $Cl_2$ per molecule of coumarin.

6. In a process for preparing 3-chlorocoumarin from coumarin, the steps of dissolving coumarin in pentachlorethane passing gaseous chlorine into the solution at from 90° C. to 130° C. to convert the coumarin into chlorocoumarins, the amount of chlorine employed being in excess of 1 molecule of $Cl_2$ per molecule of coumarin, evaporating off the solvent and chlorination products thereof heating the resulting material in a saturated aliphatic alcohol having from 1 to 4 carbon atoms for further dehydrochlorination of the coumarin dichloride content, cooling the mixture and separating the product from said alcohol.

7. In a process for preparing 3-chlorocoumarin from coumarin, the steps of dissolving coumarin in pentachlorethane passing gaseous chlorine into the solution at from 90° C. to 130° C. to convert the coumarin into chlorocoumarins, the amount of chlorine employed being in excess of 1 molecule of $Cl_2$ per molecule of coumarin, evaporating off the solvent and chlorination products thereof heating the resulting material isopropyl alcohol for further dehydrochlorination of the coumarin dichloride content, cooling the mixture and separating the product from said alcohol.

8. In a process for preparing 3-chlorocoumarin from coumarin, the steps of dissolving coumarin in at least five times its weight of pentachlorethane, passing chlorine into said solution at from 90° C. to 130° C. to convert the coumarin into chlorocoumarins and evaporating off the solvent and chlorination products thereof, the amount of chlorine employed being in excess of 1 molecule of $Cl_2$ per molecule of coumarin.

9. In a process for preparing 3-chlorocoumarin from coumarin, the steps of dissolving coumarin in pentachlorethane, passing chlorine into said solution at from 90° C. to 130° C. to convert the coumarin into chlorocoumarins, the amount of chlorine employed being in excess of 1 molecule of $Cl_2$ per molecule of coumarin, evaporating off the solvent and chlorination products thereof, heating the resulting material in isopropyl alcohol at from 64° C. to 118° C. for further dehydrochlorination of the coumarin dichloride content, cooling the mixture and separating the product from said alcohol.

HAROLD S. HALBEDEL.
JAMES C. HEATH.

No references cited.